United States Patent
Lee et al.

(10) Patent No.: US 11,137,720 B2
(45) Date of Patent: Oct. 5, 2021

(54) HOLOGRAPHIC DISPLAY DEVICE

(71) Applicant: Samsung Display Co., Ltd., Yongin-si (KR)

(72) Inventors: Hye Sog Lee, Yongin-si (KR); Hyun Sup Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 244 days.

(21) Appl. No.: 16/352,668

(22) Filed: Mar. 13, 2019

(65) Prior Publication Data

US 2019/0294109 A1    Sep. 26, 2019

(30) Foreign Application Priority Data

Mar. 21, 2018 (KR) .................. 10-2018-0032787
Mar. 21, 2018 (KR) .................. 10-2018-0032794

(51) Int. Cl.
*G03H 1/22* (2006.01)

(52) U.S. Cl.
CPC ......... *G03H 1/2205* (2013.01); *G03H 1/2294* (2013.01); *G03H 2210/33* (2013.01); *G03H 2222/13* (2013.01); *G03H 2223/15* (2013.01); *G03H 2223/23* (2013.01)

(58) Field of Classification Search
CPC ......... G03H 1/2294; G03H 2001/0224; G03H 2240/61; G03H 1/2205; G03H 2222/13; G03H 2210/33; G03H 2223/23; G03H 2223/15; G03H 2001/2271; G03H 2225/55; G03H 2001/221; G03H 1/22; G03H 2001/0088; G02B 5/32

USPC .......................................... 359/32
See application file for complete search history.

(56) References Cited

U.S. PATENT DOCUMENTS

| | | |
|---|---|---|
| 8,917,431 B2 | 12/2014 | Haussler |
| 9,897,733 B2 | 2/2018 | Han et al. |
| 2002/0114078 A1 | 8/2002 | Halle et al. |
| 2014/0043591 A1 | 2/2014 | Kurashige et al. |
| 2014/0055692 A1* | 2/2014 | Kroll .............. G03H 1/02 349/15 |
| 2014/0300709 A1* | 10/2014 | Futterer .......... G02B 30/27 348/51 |
| 2016/0209809 A1 | 7/2016 | Kim et al. |

(Continued)

FOREIGN PATENT DOCUMENTS

| | | |
|---|---|---|
| CN | 103518161 A | 1/2014 |
| CN | 106154797 A | 11/2016 |

(Continued)

*Primary Examiner* — Jade R Chwasz
(74) *Attorney, Agent, or Firm* — Lewis Roca Rothgerber Christie LLP

(57) ABSTRACT

A holographic display device includes a backlight unit for emitting light and a spatial light modulator. The spatial light modulator includes a plurality of pixels and a color filter layer including a plurality of color filter groups. The pixels are arranged in a zigzag form and are configured to modulate at least one of the amplitude and phase of the light. Each of the color filter groups includes a first sub-group including a plurality of first color filters, a second sub-group including a plurality of second color filters, and a third sub-group including a plurality of third color filters, and each of the pixels is aligned with one of the first color filters, the second color filters, and the third color filters of the color filter layer.

20 Claims, 13 Drawing Sheets

(56) References Cited

U.S. PATENT DOCUMENTS

2017/0176932 A1   6/2017   Yoon et al.
2018/0094791 A1   4/2018   Lee et al.
2018/0364643 A1   12/2018  Kroll et al.
2019/0011881 A1   1/2019   Tam et al.

FOREIGN PATENT DOCUMENTS

| CN | 107710080 A | 2/2018 | |
| KR | 10-2011-0084299 A | 7/2011 | |
| KR | 10-2013-0107606 A | 10/2013 | |
| KR | 10-2014-0079496 A | 6/2014 | |
| KR | 10-2015-0131884 A | 11/2015 | |
| KR | 10-2016-0088787 A | 7/2016 | |
| KR | 10-2018-0038101 A | 4/2018 | |
| WO | WO-2018045827 A1 * | 3/2018 | ............. G02B 5/201 |

* cited by examiner

HOLOGRAPHIC DISPLAY DEVICE

CROSS-REFERENCE TO RELATED APPLICATION(S)

The present application claims priority to and the benefit of Korean Patent Application Nos. 10-2018-0032794 and 10-2018-0032787, both filed on Mar. 21, 2018 in the Korean Intellectual Property Office, the entire disclosures of which are incorporated herein by reference.

BACKGROUND

1. Field

Aspects of embodiments of the present disclosure relate to a holographic display device.

2. Description of the Related Art

As users' interest in display devices that express (or display) increasingly realistic images having three-dimensional (3D) features (e.g., display devices that are capable of implementing (or displaying) 3D images) increases, display devices capable of expressing 3D images have recently been developed.

Techniques proposed to display 3D stereoscopic images by using display devices having 2D image display screens, such as liquid crystal display devices, include a stereoscopic image display method using special glasses, a glasses-free stereoscopic image display method, and a holographic display method.

From among the 3D image display methods, the holographic display method has recently come into spotlight. In using the holographic display method, a technique for providing a satisfactory viewing angle to reproduce a hologram image has been researched. In addition, an astigmatic lens to reproduce a color hologram image has been researched.

SUMMARY

Embodiments of the present disclosure provide a holographic display device configured to display a color hologram while having a simplified configuration.

According to an embodiment of the present disclosure, a holographic display device includes a backlight unit for emitting light and a spatial light modulator. The spatial light modulator includes a plurality of pixels and a color filter layer including a plurality of color filter groups. The pixels are arranged in a zigzag form and are configured to modulate at least one of the amplitude and phase of the light. Each of the color filter groups includes a first sub-group including a plurality of first color filters, a second sub-group including a plurality of second color filters, and a third sub-group including a plurality of third color filters, and each of the pixels is aligned with one of the first color filters, the second color filters, and the third color filters of the color filter layer.

The color filter groups may be arranged along a first direction and a second direction crossing the first direction.

The first color filters may be arranged in a plurality of rows in the first sub-group, the second color filters may be arranged in a plurality of rows in the second sub-group, and the third color filters may be arranged in a plurality of rows in the third sub-group.

A number of the first color filters in the first sub-group, a number of the second color filters in the second sub-group, and a number of the third color filters in the third sub-group may be the same.

A column of the first color filters, the second color filters, and the third color filters arranged in odd-numbered rows may be between a plurality of columns of the first color filters, the second color filters, and the third color filters arranged in even-numbered rows.

The pixels may be divided into a plurality of unit pixels, and each of the unit pixels may include first, second, and third sub-pixels. The first sub-pixel may include a pixel aligned with the first color filter, wherein the second sub-pixel may include a pixel aligned with the second color filter, and the third sub-pixel may include a pixel aligned with the third color filter.

The holographic display device may be configured to be selectively driven in a first mode for displaying a three-dimensional image and a second mode for displaying a two-dimensional image.

In the second mode, the spatial light modulator may be supplied with a data signal corresponding to the unit pixels.

The holographic display device may further include a field lens on the spatial light modulator.

The field lens may include a plurality of first pattern areas that correspond to the first color filters and allow light having a first color to be transmitted therethrough, a plurality of second pattern areas that correspond to the second color filters and allow light having a second color to be transmitted therethrough, and a plurality of third pattern areas that correspond to the third color filters and allow light having a third color to be transmitted therethrough.

The field lens may include a plurality of diffraction pattern groups, and each of the diffraction pattern groups may include one first pattern area from among the first pattern areas, one second pattern area from among the second pattern areas, and one third pattern area from among the third pattern areas.

The first pattern area and the first sub-group may overlap each other when viewed on a plane, the second pattern area and the second sub-group may overlap each other when viewed on a plane, and the third pattern area and the third sub-group may overlap each other when viewed on a plane.

The diffraction pattern groups may be arranged along a first direction and a second direction crossing the first direction.

A constant of a diffraction grid in the first pattern area may be larger than that of a diffraction grid in the second pattern area.

The grid constant of a diffraction grid in the second pattern area may be larger than that of a diffraction grid in the third pattern area.

The light having the first color may be red light, the light having the second color may be green light, and the light having the third color may be blue light.

According to another embodiment of the present disclosure, a holographic display device includes a backlight unit for emitting light, a spatial light modulator, and a field lens on the spatial light modulator. The spatial light modulator includes a plurality of pixels configured to modulate at least one of the amplitude and phase of the light and a plurality of first color filters, a plurality of second color filters, and a plurality of third color filters. The first, second, and third color filters are arranged in a zigzag form, and each of the pixels is aligned with one of the first color filters, the second color filters, and the third color filters. The field lens includes a plurality of first pattern areas that correspond to the first color filters and allow light having a first color to be transmitted therethrough, a plurality of second pattern areas that correspond to the second color filters and allow light having a second color to be transmitted therethrough, and a plurality of third pattern areas that correspond to the third color filters and allow light having a third color to be transmitted therethrough.

The first color filter, the second color filter, and the third color filter may be alternately arranged along a first direction.

The first pattern area, the second pattern area, and the third pattern area may be alternately arranged along the first direction.

The first pattern area and the first color filter may overlap each other when viewed on a plane, the second pattern area and the second color filter may overlap each other when viewed on a plane, and the third pattern area and the third color filter may overlap each other when viewed on a plane.

BRIEF DESCRIPTION OF THE DRAWINGS

Example embodiments of the present disclosure will be described more fully hereinafter with reference to the accompanying drawings; however, the present disclosure may be embodied in different forms and should not be construed as limited to the example embodiments set forth herein. Rather, these embodiments are provided so that this disclosure will be thorough and complete, and will fully convey the scope of the present disclosure to those skilled in the art.

In the figures, dimensions may be exaggerated for clarity of illustration, and like reference numerals refer to like elements throughout.

DETAILED DESCRIPTION

Figure 1:
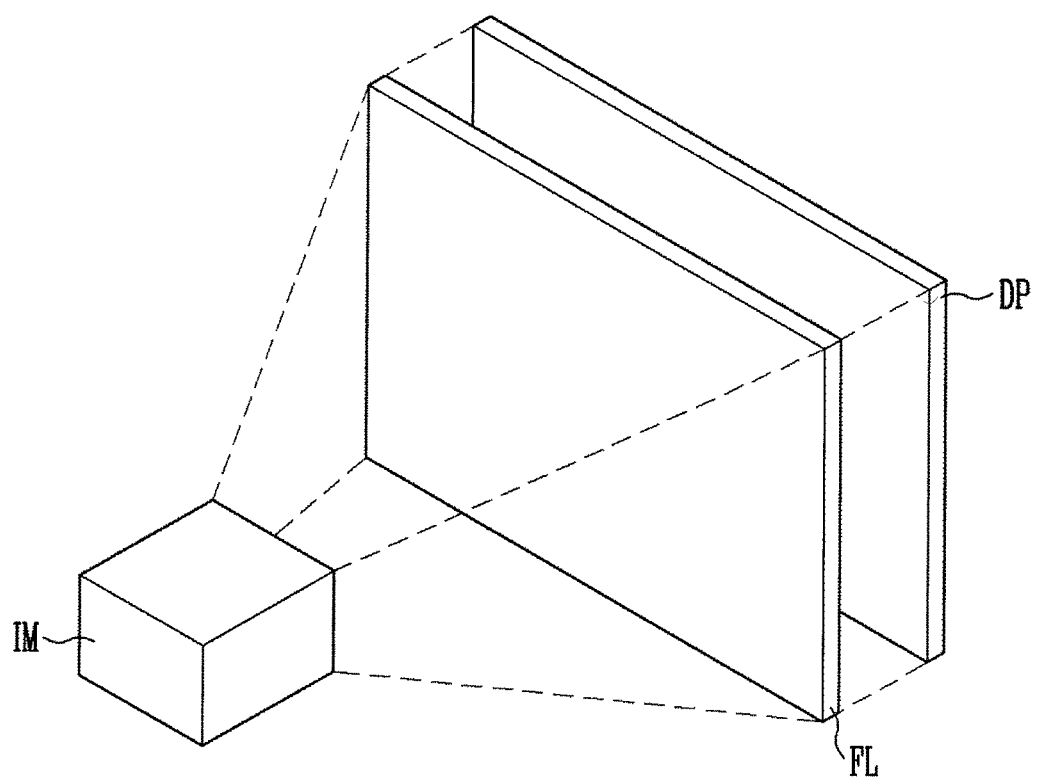
FIG. 1 is a schematic illustration of a configuration of a holographic display device according to an embodiment of the present disclosure.

Aspects and features of the present disclosure, and ways of attaining them, will become apparent with reference to example embodiments described below in conjunction with the accompanying drawings. However, the present disclosure is not limited to these example embodiments and may be implemented in different forms. These embodiments are provided for illustrative purposes and for full understanding of the scope of the present disclosure by those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. It will be understood that when an element is referred to as being "between" two elements, it may be the only element between the two elements or one or more intervening elements may also be present.

As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the term "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a spatial light modulator and a holographic display device including the same will be described with reference to example embodiments in conjunction with the accompanying drawings.

FIG. 1 is a schematic view of a configuration of a holographic display device according to an embodiment of the present disclosure.

Referring to FIG. 1, the holographic display device according to an embodiment of the present disclosure may include a display panel DP and a field lens FL.

The display panel DP may include a light source for displaying an image, a plurality of pixels, a display driver for driving the pixels, and/or the like. Further details describing the function, structure, etc. of the display panel DP will be provided below with reference to FIGS. 2 and 3.

The field lens FL may adjust an optical path of light emitted from the display panel DP by diffracting the light emitted from the display panel DP. Light transmitted through the field lens FL may be displayed as a holographic image IM at a front of the field lens FL.

The holographic display device according to an embodiment of the present disclosure may display a planar image (e.g., a two-dimensional (2D) image) as well as the holographic image IM. For example, the holographic display device may be driven in a first mode for displaying a three-dimensional holographic image or a second mode for displaying a two-dimensional planar image.

The holographic display device may be driven in the first mode or the second mode according to a setting of a user (e.g., the holographic display device may be selectively driven in the first mode or the second mode). In some embodiments, the holographic display device may be driven in the first mode or the second mode (e.g., selectively driven in the first mode or the second mode) according to a control signal or data signal (e.g., a predetermined control signal or data signal) input from the outside (e.g., input from an external device).

Figure 2:
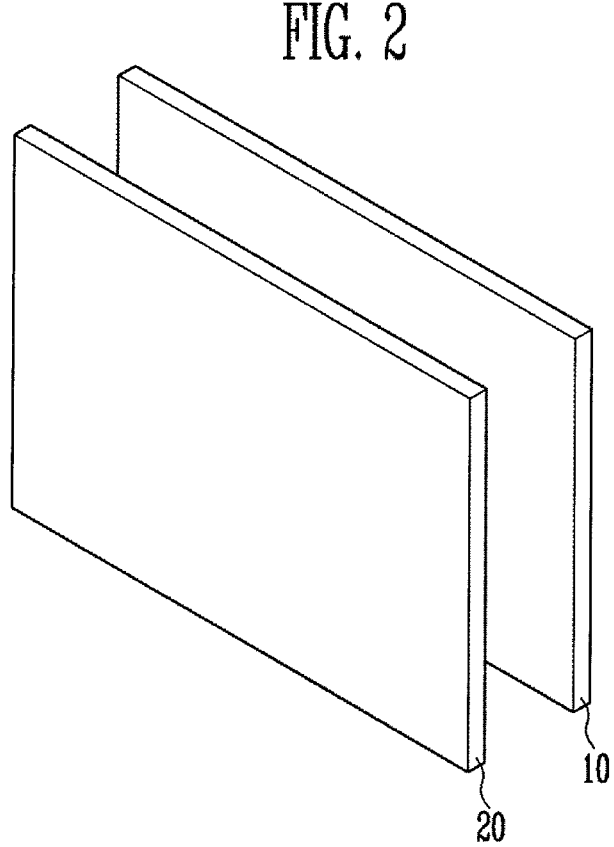
FIG. 2 is an illustration of a configuration of a display panel shown in FIG. 1.

FIG. 2 is an illustration of a configuration of the display panel DP shown in FIG. 1.

Referring to FIG. 2, the display panel DP may include a backlight unit 10 and a spatial light modulator (SLM) 20.

The backlight unit 10 may generate and emit light. The backlight unit 10 may include a laser light source and may emit laser light. In other embodiments, the backlight unit 10 may include a light emitting diode (LED) light source.

The spatial light modulator 20 may include a plurality of pixels for modulating at least one of the amplitude and phase of light passing therethrough.

For example, each of the plurality of pixels may include a pixel electrode, a counter electrode, and a liquid crystal layer interposed between the pixel electrode and the counter electrode. The arrangement of liquid crystals included in the liquid crystal layer may be changed according to an electric field formed between the pixel electrode and the counter electrode, and at least one of the amplitude and phase of light passing through the liquid crystal layer may be modulated according to the arrangement of the liquid crystals.

Each of the pixels includes a color filter for determining a color of the light passing through the liquid crystal layers. For example, the spatial light modulator 20 may include a color filter layer provided with a plurality of color filters, and ones of the color filters may be aligned with ones of the pixels.

Figure 3:
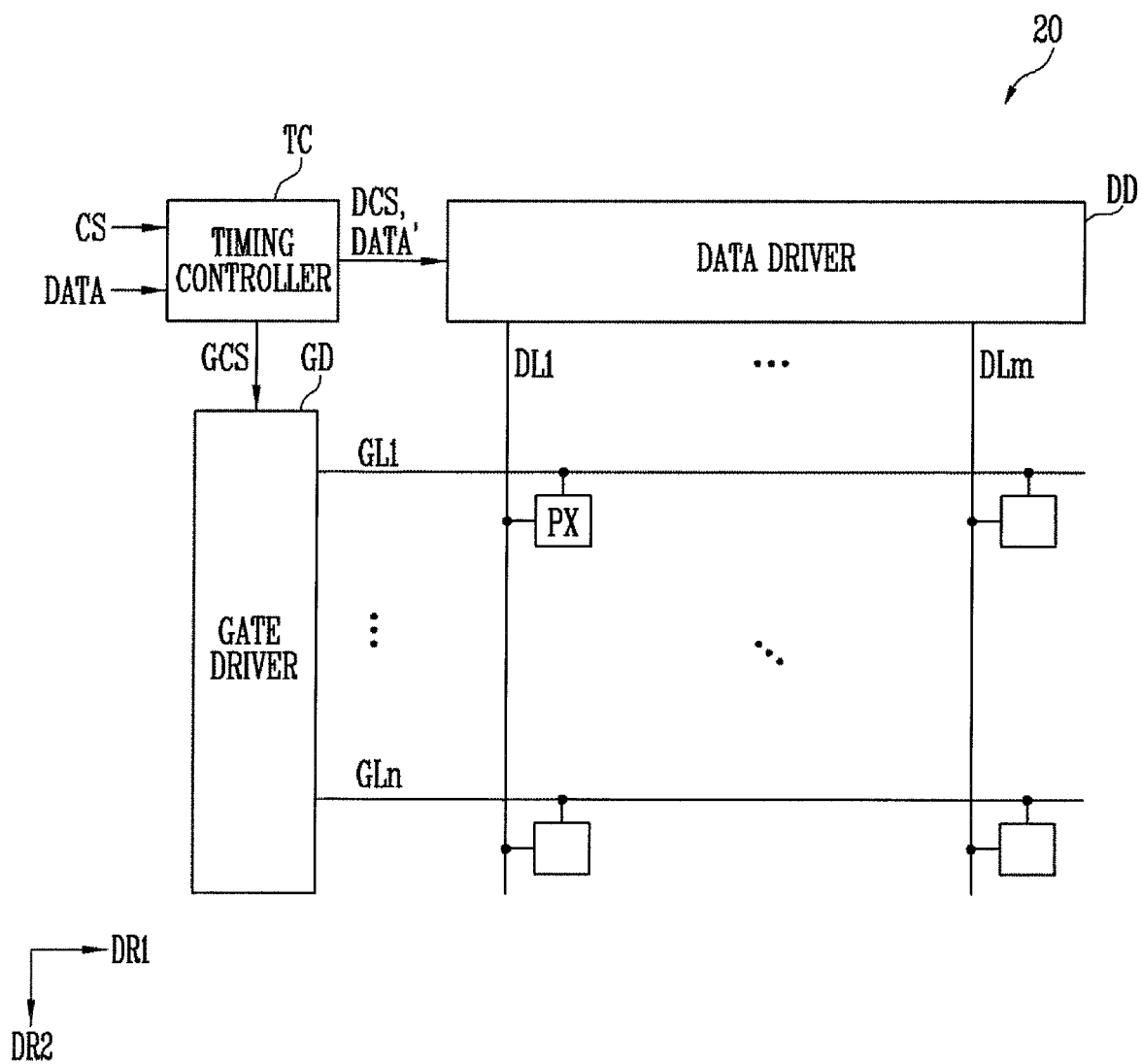
FIG. 3 is a block diagram illustrating a configuration of a spatial light modulator shown in FIG. 2.

FIG. 3 is a block diagram illustrating a configuration of the spatial light modulator shown in FIG. 2.

Referring to FIG. 3, the spatial light modulator 20 may include a plurality of data lines DL1 to DLm, a plurality of gate lines GL1 to GLn, and a plurality of pixels PX. The plurality of pixels PX may be arranged in a zigzag form.

Each of the plurality of data lines DL1 to DLm may extend in a second direction DR2, and each of the plurality of gate lines GL1 to GLn may extend in a first direction DR1 crossing (e.g., perpendicular to) the second direction DR2.

The spatial light modulator 20 may include a timing controller TC, a data driver DD, and a gate driver GD, which together drive the plurality of pixels PX.

The timing controller TC may receive a plurality of control signals CS and a data signal DATA from the outside of the holographic display device. The data signal DATA may include a data signal corresponding to a two-dimensional planar image or a data signal corresponding to a three-dimensional holographic image.

The timing controller TC may convert the data signal DATA to be suitable for specifications of the data driver DD and may output the converted data signal DATA' to the data driver DD.

The timing controller TC may generate a gate control signal GCS and a data control signal DCS in response to the control signals CS provided from the outside.

The gate control signal GCS may be a control signal for controlling an operation timing of the gate driver GD. The timing controller TC may output the gate control signal GCS to the gate driver GD.

The data control signal DCS may be a control signal for controlling an operation timing of the data driver DD. The timing controller TC may output the data control signal DCS to the data driver DD.

The gate driver GD may output gate signals in response to the gate control signal GCS. The gate lines GL1 to GLn may receive gate signals from the gate driver GD. The gate signals may be provided to the pixels PX through the gate lines GL1 to GLn.

The data driver DD may generate a data voltage. For example, the data driver DD may convert the converted data signal DATA' into data voltages in response to the data control signal DCS and may output the data voltages to the pixels PX.

Figure 4:
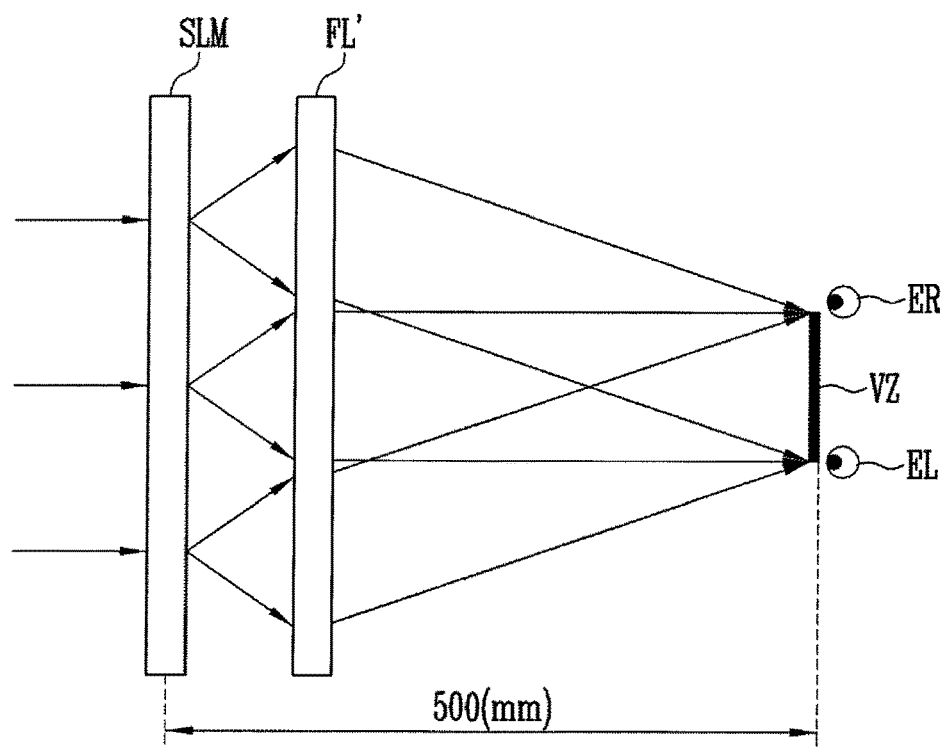
FIG. 4 is an illustration of a correlation between a pixel pitch and a viewing zone.

FIG. 4 illustrates a correlation between a pixel pitch and a viewing zone.

A pixel pitch PP may refer to a distance between pixels (e.g., a distance between two adjacent pixels). In this specification, the pixel pitch PP may refer to a distance between color filters having the same color (e.g., a between two adjacent color filters having the same color).

As shown in FIG. 4, a width of a viewing zone VZ was measured at a distance of 500 mm from the spatial light modulator SLM, and widths of the viewing zone VZ according to different pixel pitches PP are shown in Table 1.

In this specification, the viewing zone VZ may refer to a zone in which an observer can observe (e.g., can comfortably observe) a stereoscopic image. The observer can comfortably view a stereoscopic image when the width of the viewing zone VZ is equal or similar to, or larger than, a distance between the observer's eyes ER and EL.

TABLE 1

| PP (µm) | Width (mm) of VZ |
|---|---|
| 50 | 5 |
| 40 | 7 |
| 30 | 9 |
| 20 | 13 |
| 15 | 18 |
| 11.3 | 24 |
| 3.76 | 71 |

Referring to Table 1, it can be seen that the width of the viewing zone VZ increases as the pixel pitch PP decreases. For example, as the pixel pitch PP decreases, a user can view a high-quality holographic image even though a distance between the holographic display device and the user is relatively small.

Generally, a distance between a person's pupils is, on average, about 65 mm. Therefore, the width of the viewing zone VZ should be about 65 mm or more so a person may comfortably view a holographic image at a distance of about 500 mm from the holographic display device. Accordingly, a holographic display device should have a pixel pitch PP that is smaller than about 11.3 µm.

Hereinafter, a method for arranging color filters according to an embodiment of the present disclosure which provides a relatively narrow pixel pitch PP will be described.

Figure 5:
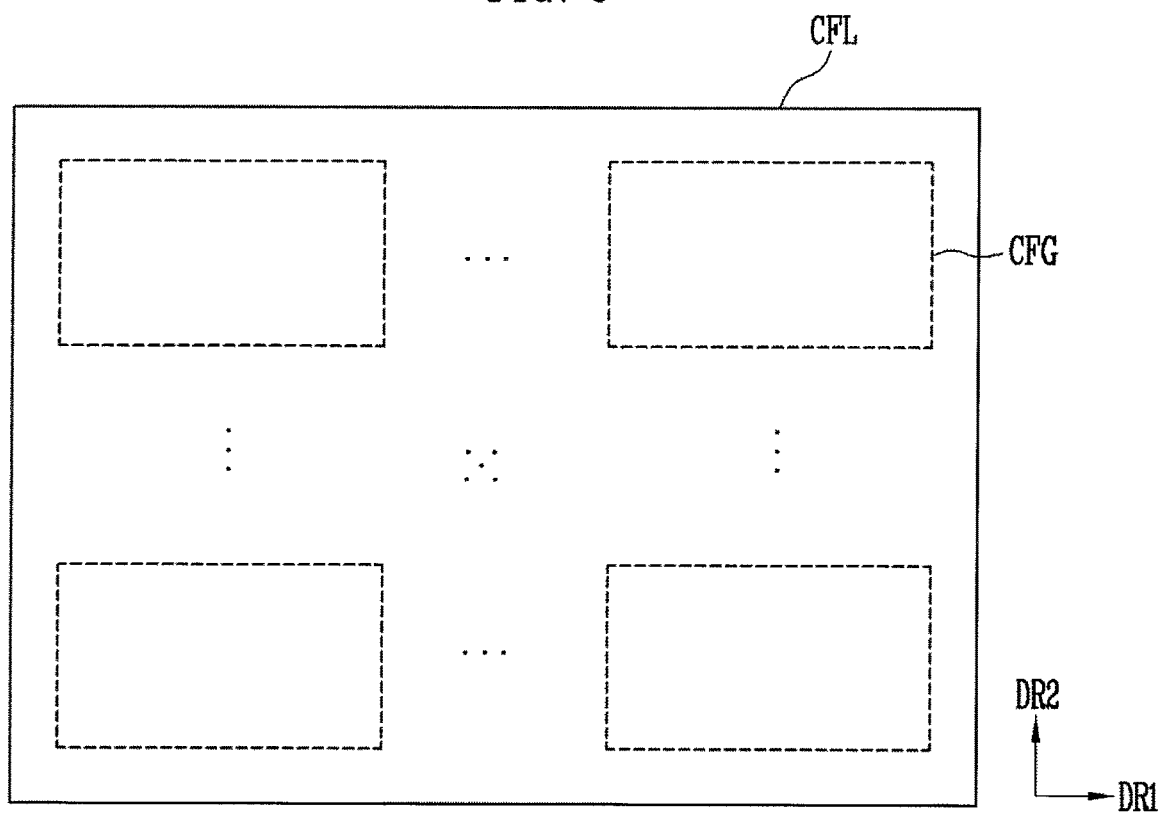
FIG. 5 is a plan view illustrating a color filter layer according to an embodiment of the present disclosure.
Figure 6:
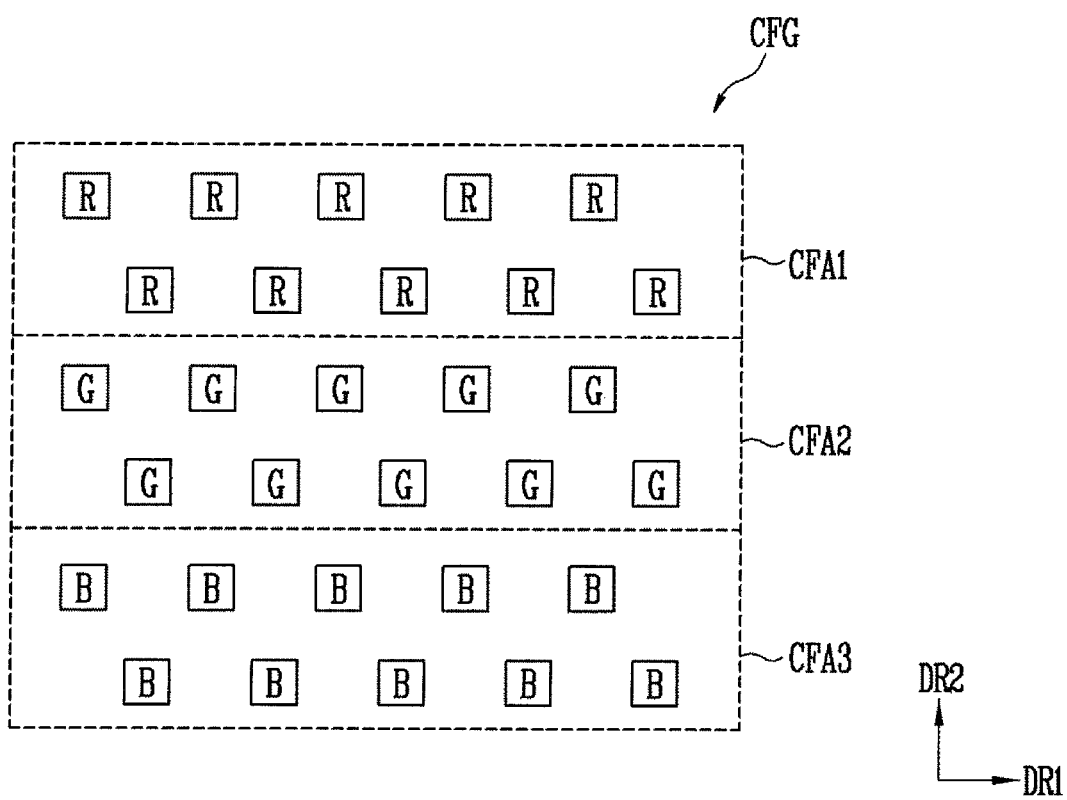
FIG. 6 is a plan view illustrating color filters arranged in a color filter group shown in FIG. 5.

FIG. 5 is a plan view illustrating a color filter layer according to an embodiment of the present disclosure, and FIG. 6 is a plan view illustrating color filters arranged in a color filter group shown in FIG. 5.

Referring to FIG. 5, a color filter layer CFL may include a plurality of color filter groups CFG.

The plurality of color filter groups CFG may be arranged along the first direction DR1 and the second direction DR2.

Although FIG. 5 illustrates a plurality of color filter groups CFG being arranged along the first direction DR1, the present disclosure is not limited thereto. In other embodiments, the number of color filter groups CFG arranged along the first direction DR1 may be variously modified.

Referring to FIG. 6, each of the plurality of color filter groups CFG may include a first sub-group CFA1, a second sub-group CFA2, and a third sub-group CFA3. The first sub-group CFA1, the second sub-group CFA2, and the third sub-group CFA3 may be arranged along (e.g., may be adjacent each other in) the second direction DR2.

The first sub-group CFA1 may include first color filters R. The first color filters R may be arranged along (e.g., may be adjacent each other in) the first direction DR1. A plurality of rows, each including first color filters R, may extend along the first direction DR1. The plurality of rows may be arranged along (e.g., may be adjacent each other in) the second direction DR2. For example, the first color filters R may be arranged in a zigzag form.

The second sub-group CFA2 may include second color filters G. The second color filters G may be arranged along (e.g., may be adjacent each other in) the first direction DR1. A plurality of rows, each including second color filters G, may extend along the first direction DR1. The plurality of rows may be arranged along (e.g., may be adjacent each other in) the second direction DR2. For example, the second color filters G may be arranged in a zigzag form.

The third sub-group CFA3 may include third color filters B. The third color filters B may be arranged along (e.g., may be adjacent each other in) the first direction DR1. A plurality of rows, each including third color filters B, may extend along the first direction DR1. The plurality of rows may be arranged along (e.g., may be adjacent each other in) the second direction DR2. For example, the third color filters B may be arranged in a zigzag form.

Referring to FIG. 6, the number of first color filters R included in the first sub-group CFA1, the number of second color filters G included in the second sub-group CFA2, and the number of third color filters B included in the third sub-group CFA3 may be the same.

In addition, a column of color filters arranged in even-numbered rows may be located between a plurality of columns of color filters arranged in a corresponding plurality of odd-numbered rows.

For example, columns of first color filters R arranged in a first row, second color filters G arranged in a third row, and third color filters B arranged in a fifth row and columns of first color filters R arranged in a second row, second color filters G arranged in a fourth row, and third color filters B arranged in a sixth row may be located in turn (e.g., may be alternately arranged).

Although FIG. 6 illustrates an embodiment in which, in each color filter group CFG, the first sub-group CFA1 is located at one side of (e.g., above) the second sub-group CFA2 and the third sub-group CFA3 is located at the other side of (e.g., below) the second sub-group CFA2, the present disclosure is not limited thereto. For example, in other embodiments, the arrangement sequence of the first sub-group CFA1, the second sub-group CFA2, and the third sub-group CFA3 may be variously modified.

Figure 7A:
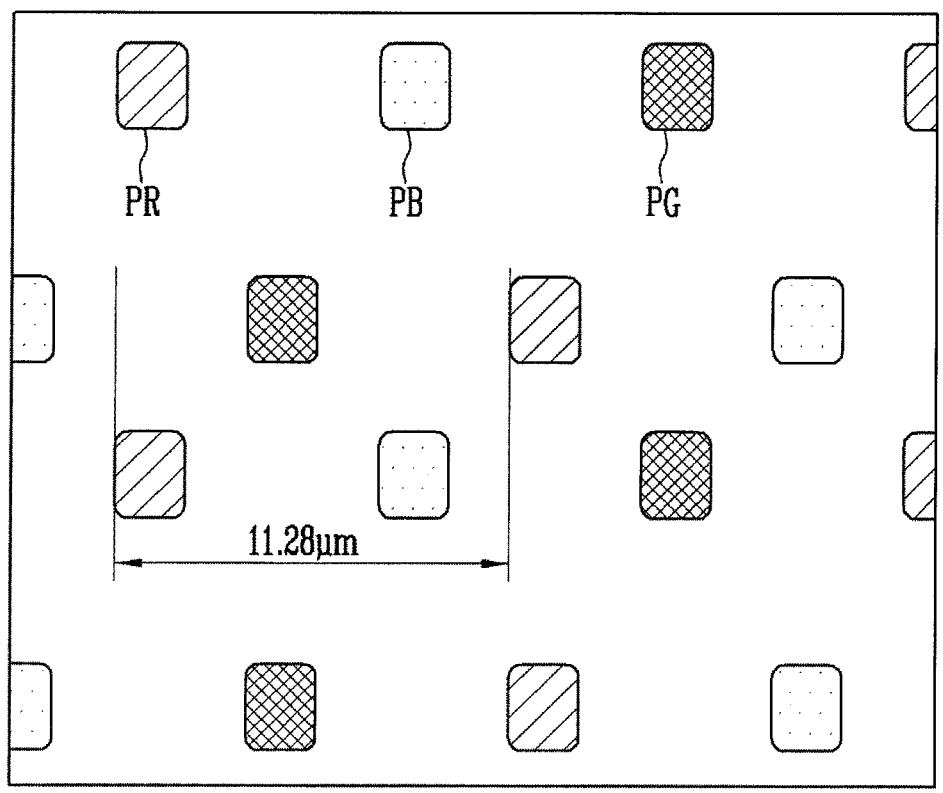
FIG. 7A is a plan view illustrating a pixel structure of a holographic display device according to a comparative example.
Figure 7B:
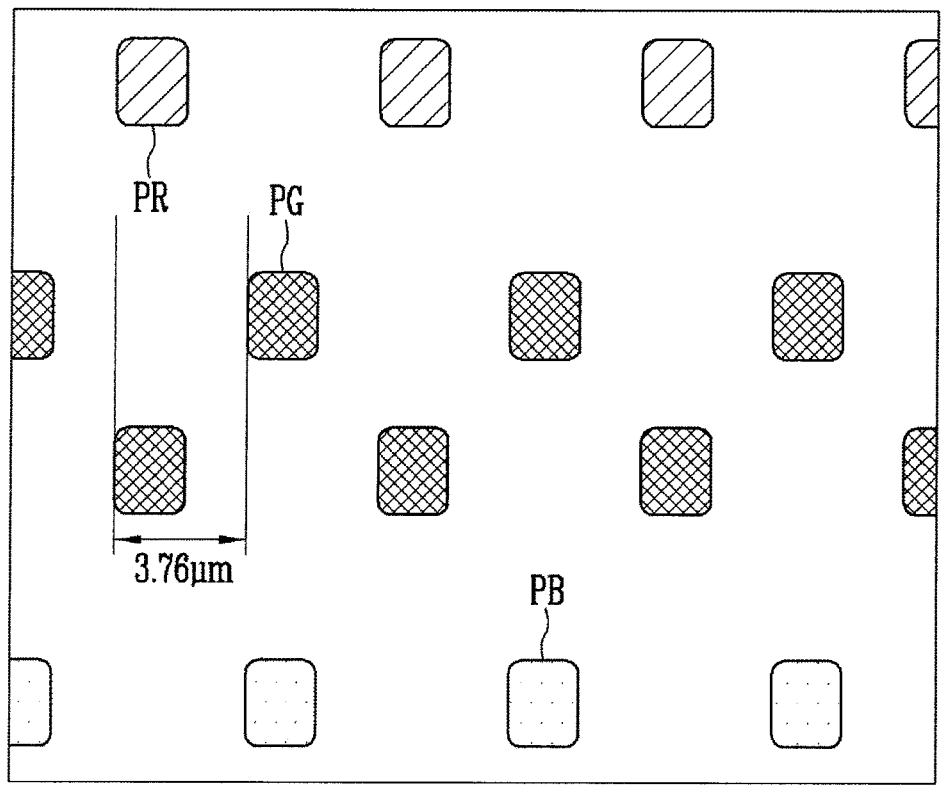
FIG. 7B is a plan view illustrating a pixel structure of a holographic display device according to an embodiment of the present disclosure.
Figure 8:
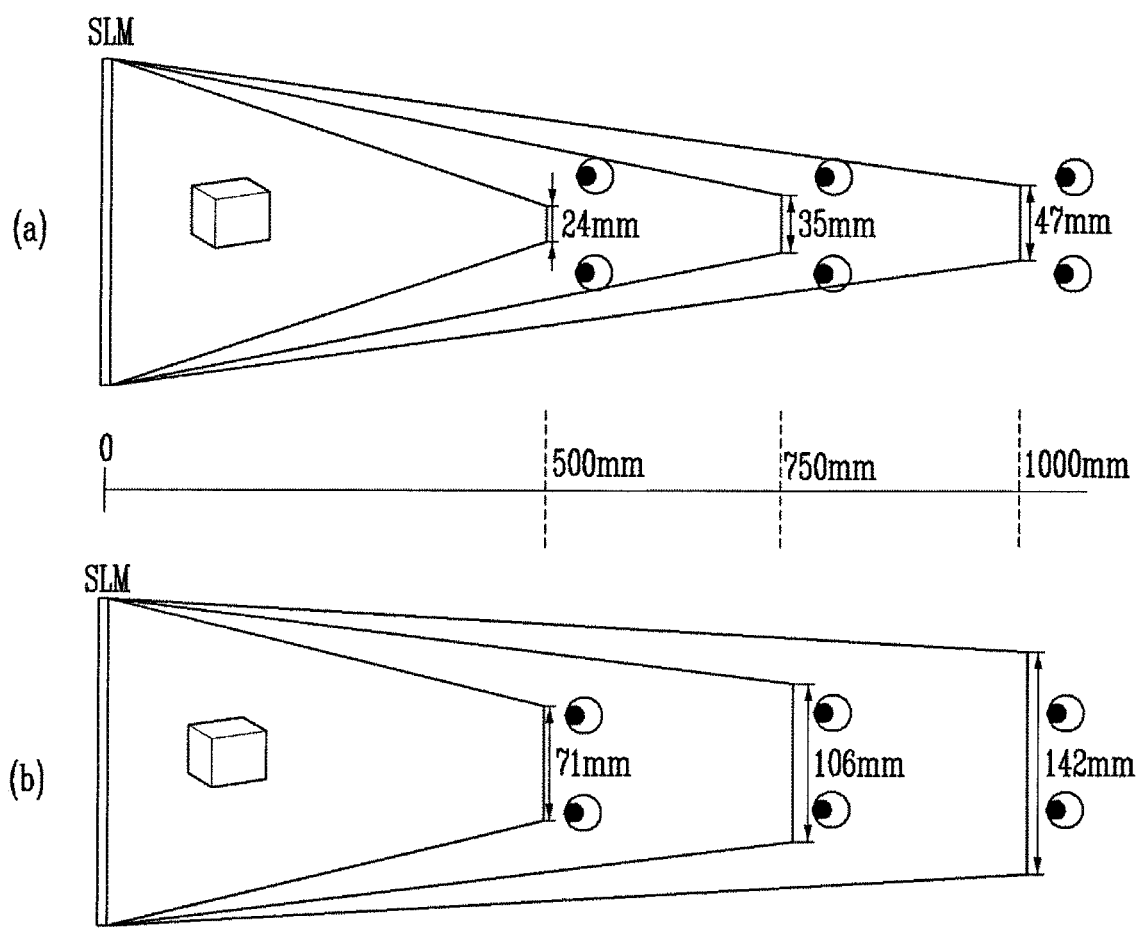
FIG. 8 is an illustration of viewing zones in the holographic display device according to the comparative example and in the holographic display device according to an embodiment of the present disclosure.

FIG. 7A is a plan view illustrating a pixel structure of a holographic display device according to a comparative example, and FIG. 7B is a plan view illustrating a pixel structure of a holographic display device according to an embodiment of the present disclosure. FIG. 8 illustrates viewing zones in the holographic display device according to the comparative example shown in FIG. 7A and the holographic display device according to the embodiment of the present disclosure shown in FIG. 7B.

In FIGS. 7A and 7B, the components of the holographic display device according to the comparative example are identical to those of the holographic display device according to the embodiment of the present disclosure, but the color filters are arranged differently.

As shown in FIG. 7A, in the display device according to the comparative example, a sub-pixel PR for emitting light having a first color (e.g., red), a sub-pixel PG for emitting light having a second color (e.g., green), and a sub-pixel PB for emitting light having a third color (e.g., blue) together constitute one pixel. The sub-pixels PR, PG, and PB are arranged side-by-side (e.g., are arranged adjacent each other) along the first direction DR1.

When a color holographic image is to be displayed, a horizontal distance (e.g., a pixel pitch PP) between sub-pixels emitting light having the same color may determine a horizontal viewing angle.

In the holographic display device according to the comparative example having the pixel arrangement structure shown in FIG. 7A, the horizontal distance between the sub-pixels PR emitting light having the first color and which are located closest to each other in the horizontal direction may be about 11.28 μm. As shown in (a) of FIG. 8, the width of the viewing zone VZ at a spot 500 mm from the spatial light modulator SLM having the pixel arrangement structure shown in FIG. 7A may be about 24 mm, the width of the viewing zone VZ at a spot 700 mm from the spatial light modulator SLM having the pixel arrangement structure shown in FIG. 7A may be about 35 mm, and the width of the viewing zone VZ at a spot 1000 mm from the spatial light modulator SLM having the pixel arrangement structure shown in FIG. 7A may be about 47 mm. That is, when the distance between an observer's eyes is about 65 mm, it may be difficult for the observer to observe a stereoscopic image even at an observation distance of about 1 m from the spatial light modulator SLM having the pixel arrangement structure shown in FIG. 7A.

In the holographic display device having a pixel arrangement structure as shown in FIG. 7B, the horizontal distance between sub-pixels PG emitting light having the same color and which are located closest to each other in the horizontal direction may be about 3.76 μm, which is smaller than that in the holographic display device shown in FIG. 7A. As shown in (b) of FIG. 8, the width of the viewing zone VZ at a spot 500 mm from the spatial light modulator SLM having the pixel arrangement structure shown in FIG. 7B may be about 71 mm, the width of the viewing zone VZ at a spot 700 mm from the spatial light modulator SLM having the pixel arrangement structure shown in FIG. 7B may be about 106 mm, and the width of the viewing zone VZ at a spot 1000 mm from the spatial light modulator SLM having the pixel arrangement structure shown in FIG. 7B may be about 142 mm. That is, when the distance between the observer's eyes is about 65 mm, the observer can sufficiently (or comfortably) observe a stereoscopic image even at an observation distance of about 500 mm from the spatial light modulator SLM having a pixel arrangement structure according to an embodiment of the present disclosure.

The observer can comfortably view a stereoscopic image when the width of the viewing zone VZ, that is, a zone in which the observer of the holographic display device can observe a stereoscopic image, is equal or/and similar to or larger than the distance between the observer's eyes.

When a color holographic image is displayed, a horizontal distance between pixels emitting light having the same color may determine a horizontal viewing angle, and the width of the viewing zone VZ may increase as the horizontal viewing angle increases.

When pixels emitting light having the same color are arranged side-by-side along the first direction DR1, the horizontal distance between the pixels emitting light having the same color may be reduced as compared with an example in which pixels emitting light having different colors are arranged side-by-side along the first direction DR1.

Figure 9:
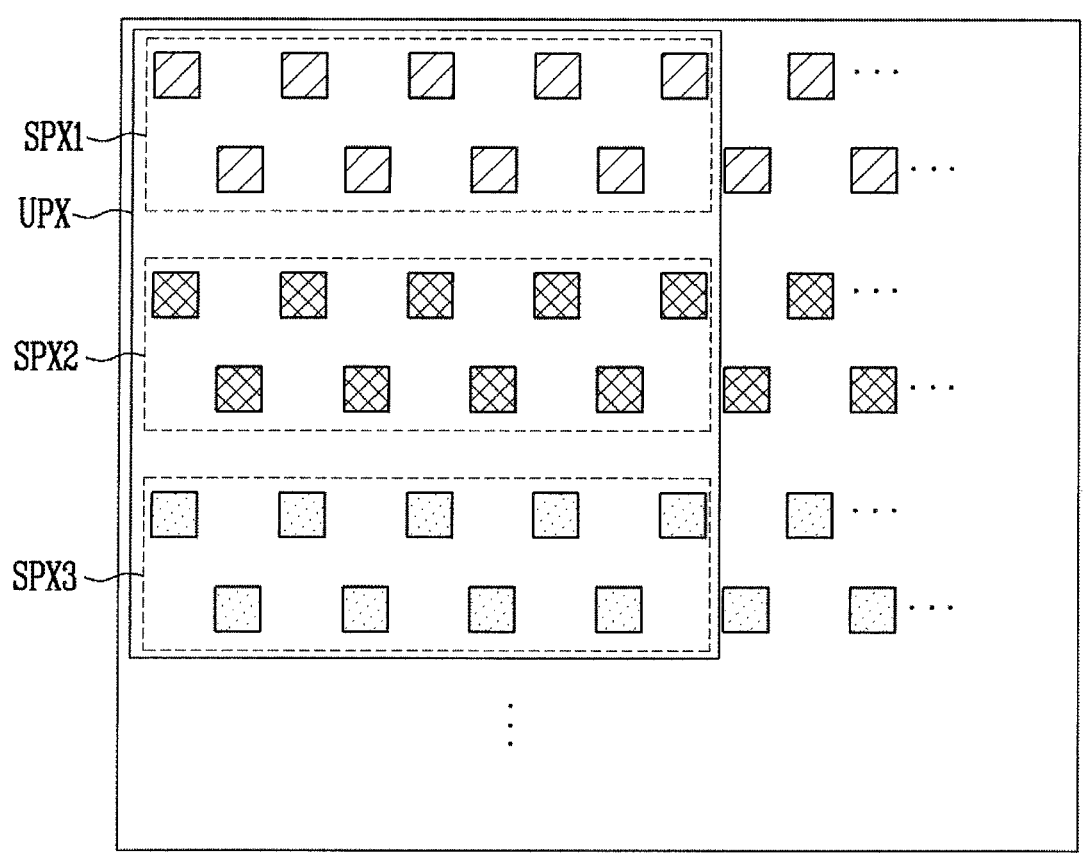
FIG. 9 is an illustration of a unit pixel according to an embodiment of the present disclosure.

FIG. 9 is a view of a unit pixel according to an embodiment of the present disclosure.

As described above, a holographic display device according to an embodiment of the present disclosure may be driven in a first mode for displaying a three-dimensional holographic image and/or a second mode for displaying a two-dimensional planar image.

When the holographic display device is driven in the second mode, the timing controller TC of the spatial light modulator 20 may provide a data signal corresponding to the two-dimensional image to the data driver DD.

The data signal corresponding to the two-dimensional image may include a data signal (e.g., an RGB stripe type data signal) corresponding to a plurality of unit pixels.

Referring to FIG. 9, a plurality of pixels PX may be divided into a plurality of unit pixels UPX to emit light by being supplied with a data signal corresponding to the two-dimensional image.

Each unit pixel UPX may be configured with (e.g., may include) a first sub-pixel SPX1 emitting light having a first color, a second sub-pixel SPX2 emitting light having a second color, and a third sub-pixel SPX3 emitting light having a third color.

The first sub-pixel SPX1 may include a plurality of pixels PX including a first color filter R, the second sub-pixel SPX2 may include a plurality of pixels PX including a second color filter G, and the third sub-pixel SPX3 may include a plurality of pixels PX including a third color filter B. The plurality of pixels PX may constitute each of the sub-pixels SPX1, SPX2, and SPX3.

When the plurality of pixels PX are configured to have a resolution of 2250 ppi (pixel per inch) and are arranged adjacent each other at the distance as shown in FIG. 7B, and when each of the first to third sub-pixels SPX1, SPX2, and SPX3 includes nine pixels, the unit pixel UPX may have a size of about 33.84 μm and may have a resolution of about 750 ppi. Thus, a high-resolution two-dimensional image may be expressed in the second mode.

Although the number of pixels including the first color filter included in the first sub-pixel SPX1, the number of pixels including the second color filter included in the second sub-pixel SPX2, and the number of pixels including the third color filter included in the third sub-pixel SPX3 are illustrated as being the same in FIG. 9, the present disclosure is not limited thereto.

Hereinafter, a field lens FL according to an embodiment of the present disclosure will be described in detail with reference to FIGS. 10-15.

Figure 10:
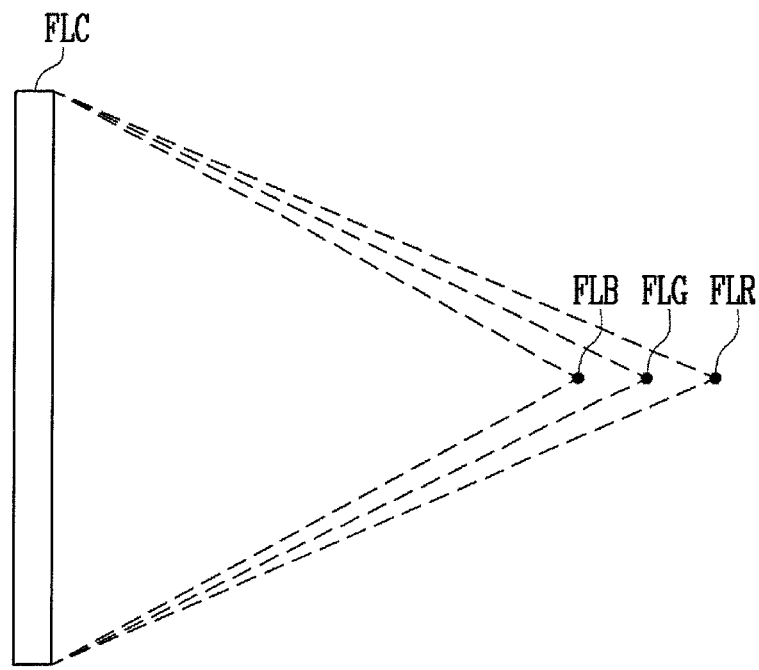
FIG. 10 is a view illustrating a focal distance of light transmitted through a field lens according to a comparative example.

FIG. 10 illustrates a focal distance of light transmitted through a field lens according to a comparative example.

In FIG. 10, a first focus point (e.g., a first focal point or first focal distance) FLR is a focus point of light having a first color that is transmitted through the field lens FLC according to the comparative example, a second focus point (e.g., a second focal point or second focal distance) FLG is a focus point of light having a second color that is transmitted through the field lens FLC according to the comparative example, and a third focus point (e.g., a third focal point or third focal distance) FLB is a focus point of light having a third color that is transmitted through the field lens FLC according to the comparative example.

The first color may be red, the second color may be green, and the third color may be blue.

Referring to FIG. 10, the focus points of the light having the first to third colors may be different from one another. For example, the first focus point FLR may be at a spot about 1110 mm from the field lens FLC, the second focus point FLG may be at a spot about 1050 mm from the field lens FLC, and the third focus point FLB may be at a spot about 930 mm from the field lens FLC.

To display a high-definition color holographic image, the focus points of the light having the first to third colors should be at the same or substantially the same spot (e.g., the same or substantially the same distance from the display device). Thus, a field lens that focuses the light having the first to third colors at the same or substantially the same spot is desired.

Figure 11:
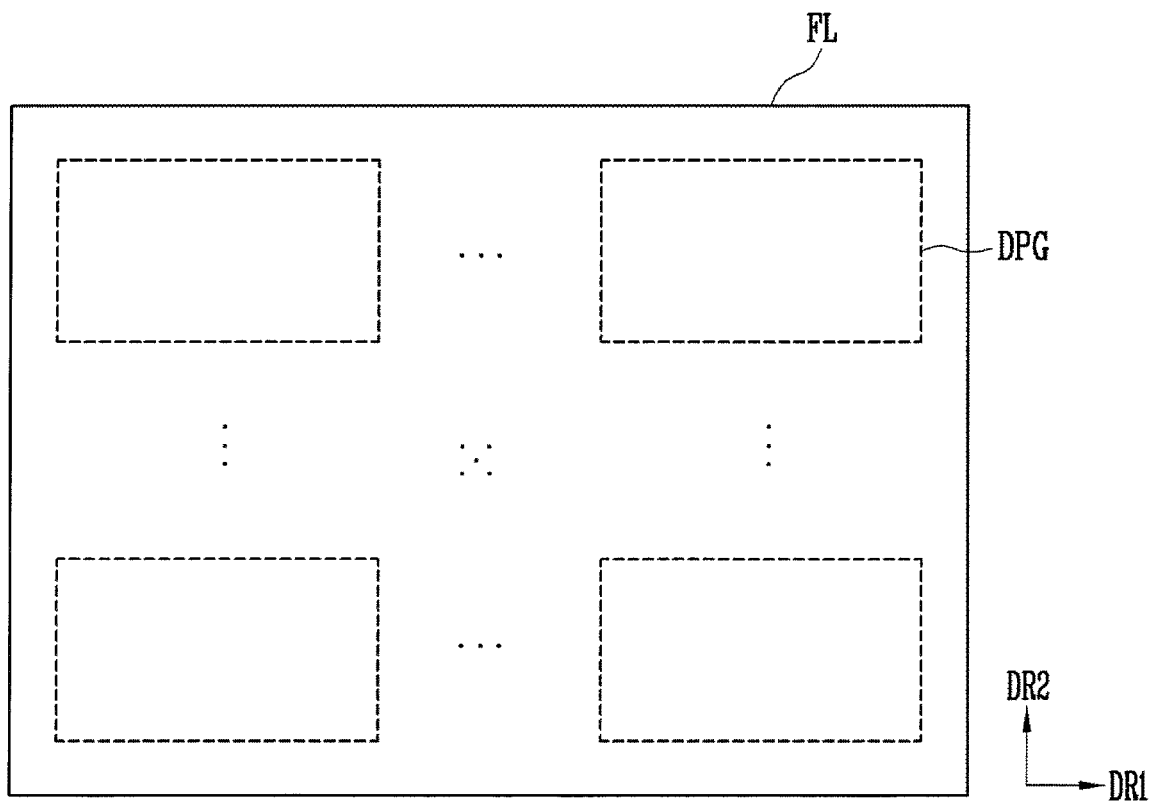
FIG. 11 is a plan view illustrating a field lens according to an embodiment of the present disclosure.
Figure 12:
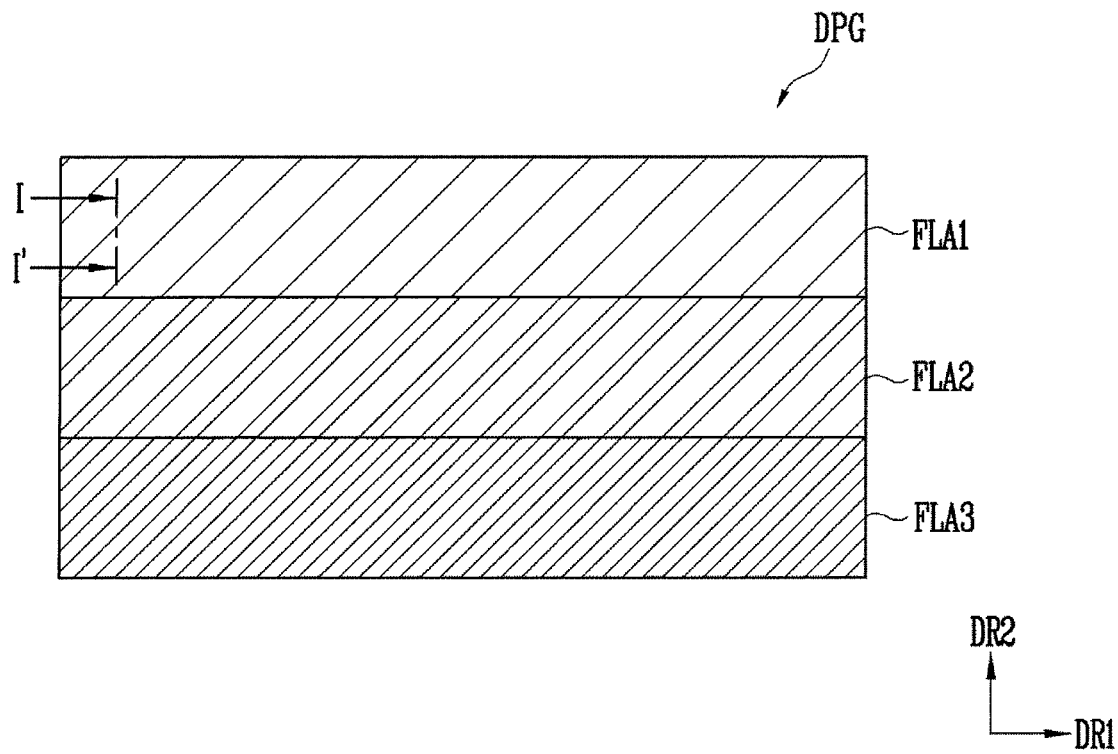
FIG. 12 is a plan view illustrating a diffraction pattern group shown in FIG. 11.

FIG. 11 is a plan view of a field lens according to an embodiment of the present disclosure, and FIG. 12 is a plan view of a diffraction pattern group shown in FIG. 11.

Referring to FIG. 11, the field lens FL according to an embodiment of the present disclosure may include a plurality of diffraction pattern groups DPG.

The plurality of diffraction pattern groups DPG may be arranged side-by-side along the first direction DR1 and the second direction DR2.

Referring to FIG. 12, each of the plurality of diffraction pattern groups DPG may include a first pattern area FLA1, a second pattern area FLA2, and a third pattern area FLA3. The first pattern area FLA1, the second pattern area FLA2, and the third pattern area FLA3 may be arranged along (e.g., may be adjacent each other) the second direction DR2.

The first pattern area FLA1 may correspond to the first sub-group CFA1. Therefore, light having a first color may be transmitted through the first pattern area FLA1. Accordingly, the first sub-group CFA1 and the first pattern area FLA1 may overlap each other when viewed on a plane.

The second pattern area FLA2 may correspond to the second sub-group CFA2. Therefore, light having a second color may be transmitted through the second pattern area FLA2. Accordingly, the second sub-group CFA2 and the second pattern area FLA2 may overlap each other when viewed on a plane.

The third pattern area FLA3 may correspond to the third sub-group CFA3. Therefore, light having a third color may be transmitted through the third pattern area FLA3. Accordingly, the third sub-group CFA3 and the third pattern area FLA3 may overlap each other when viewed on a plane.

Figure 13:
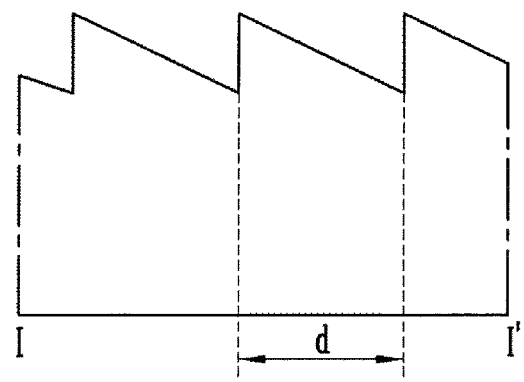
FIG. 13 is a sectional view taken along the line I-I' of FIG. 12.

FIG. 13 is a sectional view taken along the line I-I' of FIG. 12.

Referring to FIG. 13, a diffraction grid pattern may be formed in the field lens FL. For example, the diffraction grid pattern may have a shape in which a plurality of saw-toothed patterns are formed at a distance from each other.

Although only the diffraction grid pattern in the first pattern area FLA1 is illustrated as an example in FIG. 13, saw-toothed diffraction grid patterns may also be formed in the second pattern area FLA2 and the third pattern area FLA3.

To compensate for chromatic aberration, grid constants d of the diffraction grid patterns in the first to third pattern areas FLA1, FLA2, and FLA3 (e.g., distances between adjacent ones of the saw-tooth grid patterns) may be different from one another.

For example, the grid constant d of the diffraction grid pattern in the first pattern area FLA1 may be larger than the grid constant d of the diffraction grid pattern in the second pattern area FLA2, and the grid constant d of the diffraction grid pattern in the second pattern area FLA2 may be larger than the grid constant d of the diffraction grid pattern in the third pattern area FLA3.

A holographic display device according to a comparative example generally includes a micro lens. The micro lens refracts light and includes a bent surface different from the field lens FL according to an embodiment of the present disclosure. When the micro lens is used, a process of forming a planarization layer covering the bent surface is separately required. However, when the field lens according to an embodiment of the present disclosure is used, a separate planarization process may be omitted.

In addition, when the micro lens is used, a distance between a focus point of each pixel is to be considered when a micro lens is arranged on each pixel. For example, a compensation value corresponding to the distance between the focus point and the pixel is calculated, and the micro lens is arranged such that a difference in a distance between the center of the micro lens and the center of the pixel corresponds to the compensation value. However, when the field lens FL according to an embodiment of the present disclosure is used, consideration of a distance between a focus point of each pixel is not required.

In addition, when the micro lens is used, several process are performed, such as a process of designing a micro lens corresponding to each color, a process of calculating the above-described compensation value, a process of manufacturing an imprint or mold for arranging the micro lens according to the compensation value, and a process of arranging the micro lens manufactured using the imprint or mold on a pixel. However, when the field lens FL according to an embodiment of the present disclosure is used, a process of calculating a compensation value and/or a process of manufacturing a separate imprint or mold for the field lens FL can be omitted. Further, the field lens FL according to an embodiment of the present disclosure can be manufactured having a size equal to that of a panel on which the pixels are formed. Thus, the field lens FL can be more easily arranged as compared with how the micro lens is arranged on each pixel.

In addition, a fill factor of the field lens FL may be greater than that of the micro lens.

In addition, the field lens FL is relatively thin as compared with the micro lens. For example, when the micro lens is generally manufactured to have a thickness of about 3 μm to about 10 μm, the field lens FL is manufactured to have a thickness of about 1 μm.

Figure 14:
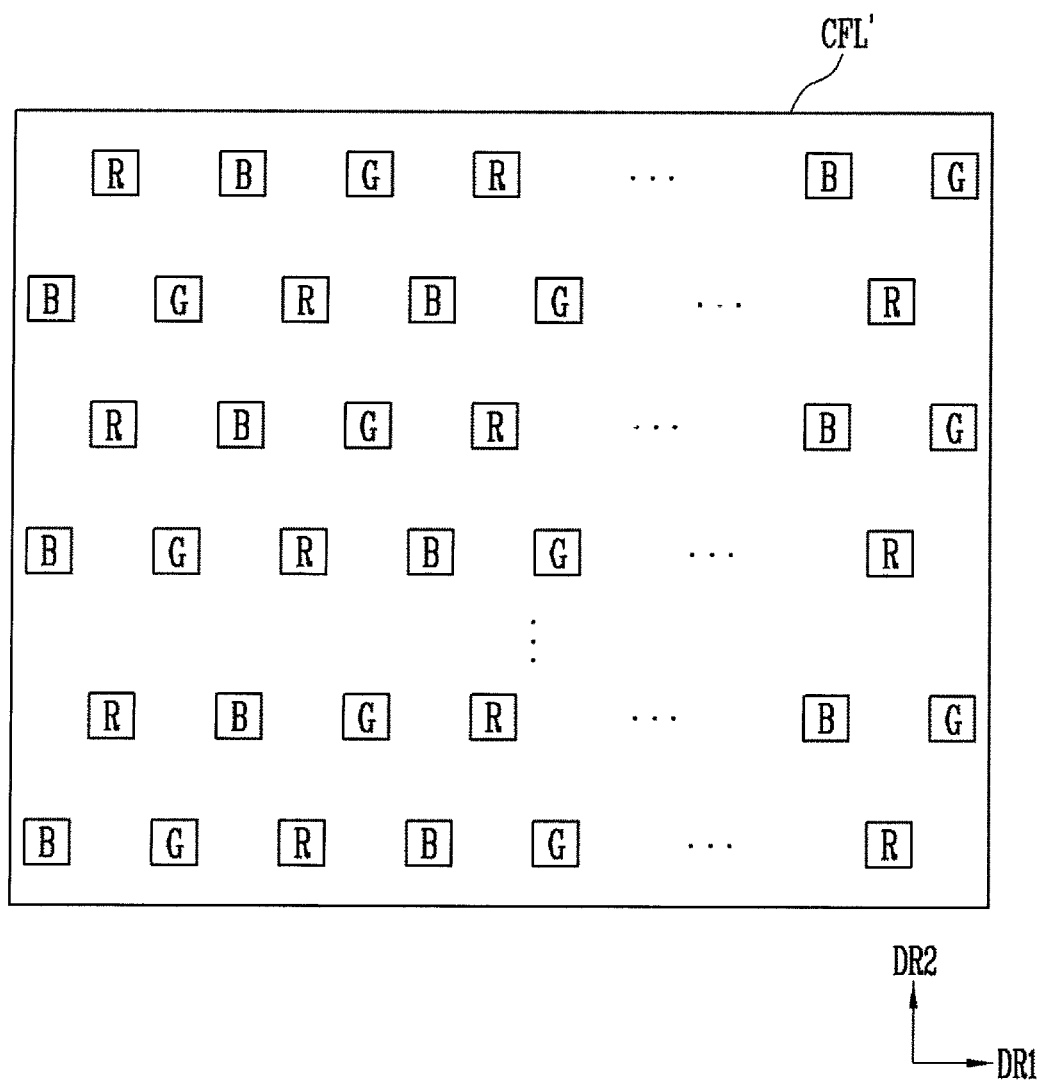
FIG. 14 is a plan view illustrating a color filter layer corresponding to the pixel structure shown in FIG. 7A.

FIG. 14 is a plan view of a color filter layer corresponding to the pixel structure shown in FIG. 7A. Aspects, components, and configurations of the color filter layer shown in FIG. 14 that are different as compared with the embodiment described with reference to FIG. 6 will be primarily described, and descriptions of aspects, components, and configurations overlapping with (e.g., that are the same as or substantially similar to) those of the embodiment described with reference to FIG. 6 may be omitted. Hereinafter, an arrangement structure of color filters will be primarily described.

Referring to FIG. 14, the color filter layer CFL' may include first color filters R, second color filters G, and third color filters B.

The first color filter R, the third color filter B, and the second color filter G may be sequentially repeatedly arranged along the first direction DR1. Columns including one of the color filters R, G, and B arranged along (e.g., adjacent each other in) the first direction DR1 may extend along the second direction DR2.

Although the first color filter R, the third color filter B, and the second color filter G are sequentially arranged along the first direction DR1 in FIG. 14, the present disclosure is not limited thereto. The arrangement sequence of the first color filter R, the second color filter G, and the third color filter B may be variously, suitably modified.

Figure 15:
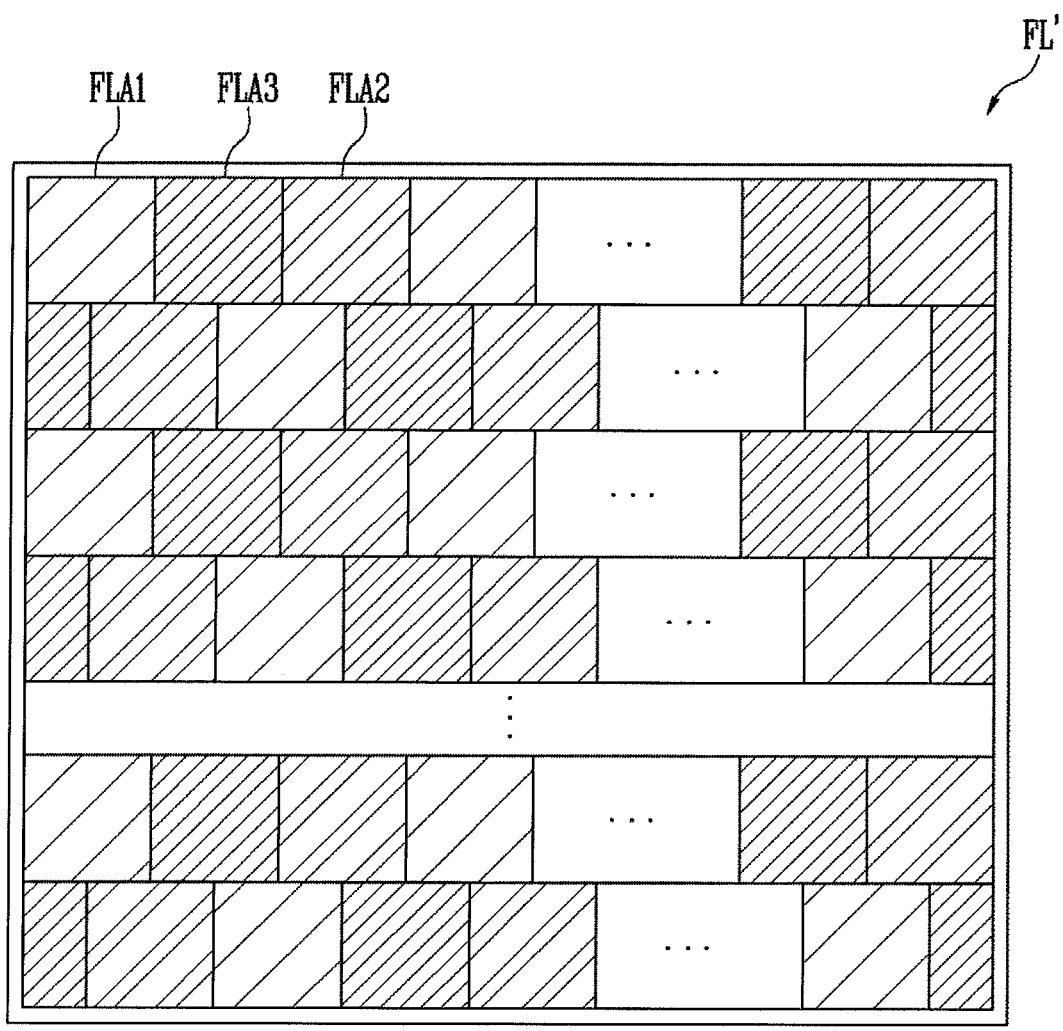
FIG. 15 is a plan view illustrating a field lens according to another embodiment of the present disclosure.

FIG. 15 is a plan view of a field lens according to another embodiment of the present disclosure. Aspects, components, and configurations of the field lens shown in FIG. 15 that are different as compared with the above-described embodiment will be primarily described, and descriptions of aspects, components, and configurations overlapping with those of the above-described embodiment may be omitted. Hereinafter, an arrangement structure of pattern areas will be primarily described.

Referring to FIG. 15, the field lens FL' according to the another embodiment of the present disclosure may include a first pattern area FLA1, a second pattern area FLA2, and a third pattern area FLA3.

The first pattern area FLA1, the third pattern area FLA3, and the second pattern area FLA2 may be sequentially repeatedly arranged along the first direction DR1 to correspond to the color filter layer CFL' shown in FIG. 14. A row including pattern areas FLA1, FLA2, and FLA3 extending along the first direction DR1 may be arranged along (e.g., adjacent each other in) the second direction DR2.

The first pattern area FLA1 may correspond to the first color filter R. Therefore, light having a first color may be transmitted through the first pattern area FLA1. Accordingly, the first color filter R and the first pattern area FLA1 may overlap each other when viewed on a plane.

The second pattern area FLA2 may correspond to the second color filter G. Therefore, light having a second color may be transmitted through the second pattern area FLA2. Accordingly, the second color filter G and the second pattern area FLA2 may overlap each other when viewed on a plane.

The third pattern area FLA3 may correspond to the third color filter B. Therefore, light having a third color may be transmitted through the third pattern area FLA3. Accordingly, the third color filter B and the third pattern area FLA3 may overlap each other when viewed on a plane.

According to embodiments of the present disclosure, a holographic display device for implementing a color hologram has a simplified configuration.

Further, according to embodiments of the present disclosure, the viewing angle of the holographic display device is improved.

Further, according to embodiments of the present disclosure, an astigmatic field lens suitable for the holographic display device is provided.

Example embodiments of the present disclosure have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made to the embodiments described herein without departing from the spirit and scope of the present disclosure as set forth in the following claims and their equivalents.

What is claimed is:

1. A holographic display device comprising:
a backlight unit for emitting light; and
a spatial light modulator comprising:
a plurality of pixels arranged in a plurality of rows extending in one of a first direction and a second direction, the first direction crossing the second direction, the rows being adjacent to each other in the other one of the first direction and the second direction, ones of the rows being offset from a preceding one of the rows such that the pixels are arranged in a zigzag form, the pixels being configured to modulate at least one of the amplitude and phase of the light; and
a color filter layer comprising a plurality of color filter groups, each of the color filter groups comprising a first sub-group comprising a plurality of first color filters directly adjacent to each other in the one of the first direction and the second direction, a second sub-group comprising a plurality of second color filters directly adjacent to each other in the one of the first direction and the second direction, and a third sub-group comprising a plurality of third color filters directly adjacent to each other in the one of the first direction and the second direction,
wherein each of the pixels is aligned with one of the first color filters, the second color filters, and the third color filters of the color filter layer.

2. The holographic display device of claim 1, wherein the color filter groups are arranged along the first direction and the second direction.

3. The holographic display device of claim 1, wherein the first color filters are arranged in a plurality of rows in the first sub-group,
wherein the second color filters are arranged in a plurality of rows in the second sub-group, and
wherein the third color filters are arranged in a plurality of rows in the third sub- group.

4. The holographic display device of claim 3, wherein a number of the first color filters in the first sub-group, a number of the second color filters in the second sub-group, and a number of the third color filters in the third sub-group are the same.

5. The holographic display device of claim 3, wherein a column of the first color filters, the second color filters, and the third color filters arranged in odd-numbered rows is between a plurality of columns of the first color filters, the second color filters, and the third color filters arranged in even-numbered rows.

6. The holographic display device of claim 1, wherein the pixels are divided into a plurality of unit pixels, each of the unit pixels comprising first, second, and third sub-pixels,
wherein the first sub-pixel comprises a pixel aligned with the first color filter,
wherein the second sub-pixel comprises a pixel aligned with the second color filter, and
wherein the third sub-pixel comprises a pixel aligned with the third color filter.

7. The holographic display device of claim 6, wherein the holographic display device is configured to be selectively driven in a first mode for displaying a three-dimensional image and a second mode for displaying a two-dimensional image.

8. The holographic display device of claim 7, wherein, in the second mode, the spatial light modulator is supplied with a data signal corresponding to the unit pixels.

9. The holographic display device of claim 1, further comprising a field lens on the spatial light modulator.

10. The holographic display device of claim 9, wherein the field lens comprises a plurality of first pattern areas that correspond to the first color filters and allow light having a first color to be transmitted therethrough, a plurality of second pattern areas that correspond to the second color filters and allow light having a second color to be transmitted therethrough, and a plurality of third pattern areas that correspond to the third color filters and allow light having a third color to be transmitted therethrough.

11. The holographic display device of claim 10, wherein the field lens comprises a plurality of diffraction pattern groups, and
wherein each of the diffraction pattern groups comprises one first pattern area from among the first pattern areas, one second pattern area from among the second pattern areas, and one third pattern area from among the third pattern areas.

12. The holographic display device of claim 11, wherein the first pattern area and the first sub-group overlap each other when viewed on a plane,
wherein the second pattern area and the second sub-group overlap each other when viewed on a plane, and
wherein the third pattern area and the third sub-group overlap each other when viewed on a plane.

13. The holographic display device of claim 11, wherein the diffraction pattern groups are arranged along a first direction and a second direction crossing the first direction.

14. The holographic display device of claim 11, wherein a grid constant of a diffraction grid in the first pattern area is larger than that of a diffraction grid in the second pattern area.

15. The holographic display device of claim 14, wherein the grid constant of a diffraction grid in the second pattern area is larger than that of a diffraction grid in the third pattern area.

16. The holographic display device of claim 11, wherein the light having the first color is red light,
wherein the light having the second color is green light, and
wherein the light having the third color is blue light.

17. A holographic display device comprising:
a backlight unit for emitting light;
a spatial light modulator comprising:
a plurality of pixels configured to modulate at least one of the amplitude and phase of the light; and
a plurality of first color filters, a plurality of second color filters, and a plurality of third color filters, the first, second, and third color filters being respectively arranged in a plurality of rows extending in one of a first direction and a second direction, the first direction crossing the second direction, the rows being adjacent to each other in the other one of the first direction and the second direction, ones of the rows being offset from a preceding one of the rows such that the first, second, and third color filters are arranged in a zigzag form, each of the pixels being aligned with one of the first color filters, the second color filters, and the third color filters; and
a field lens on the spatial light modulator, the field lens comprising a plurality of first pattern areas that correspond to the first color filters and allow light having a first color to be transmitted therethrough, a plurality of second pattern areas that correspond to the second color filters and allow light having a second color to be transmitted therethrough, and a plurality of third pattern areas that correspond to the third color filters and allow light having a third color to be transmitted therethrough.

18. The holographic display device of claim 17, wherein the first color filter, the second color filter, and the third color filter are alternately arranged along a first direction.

19. The holographic display device of claim 18, wherein the first pattern area, the second pattern area, and the third pattern area are alternately arranged along the first direction.

20. The holographic display device of claim 19, wherein the first pattern area and the first color filter overlap each other when viewed on a plane,
wherein the second pattern area and the second color filter overlap each other when viewed on a plane, and
wherein the third pattern area and the third color filter overlap each other when viewed on a plane.

* * * * *